United States Patent [19]

Ueno et al.

[11] 4,189,418

[45] Feb. 19, 1980

[54] CAN END SEALING RUBBER COMPOSITION CONTAINING A STYRENE-BUTADIENE RUBBERY COPOLYMER, A TACKIFIER AND A FILLER

[75] Inventors: Hiroshi Ueno, Yokosuka; Shunji Kojima, Yokohama; Masanori Aizawa, Yokohama; Akira Kishimoto, Yokohama, all of Japan

[73] Assignee: Toyo Seikan Kaisha Limited, Tokyo, Japan

[21] Appl. No.: 858,208

[22] Filed: Dec. 7, 1977

[30] Foreign Application Priority Data

Dec. 16, 1976 [JP] Japan .............................. 51-150294
Aug. 29, 1977 [JP] Japan .............................. 52-102644

[51] Int. Cl.² .................................................. C08L 9/08
[52] U.S. Cl. ........................ 260/29.7 R; 260/27 BB; 260/42.32; 260/42.47
[58] Field of Search .......... 260/29.7 R, 27 BB, 42.32, 260/42.47, 828

[56] References Cited

U.S. PATENT DOCUMENTS

| | | | |
|---|---|---|---|
| 3,950,280 | 4/1976 | Singleton | 260/4 R |
| 3,986,629 | 10/1976 | Singleton | 220/81 R |

FOREIGN PATENT DOCUMENTS

| | | | |
|---|---|---|---|
| 50-29669 | 3/1975 | Japan | 260/29.7 R |
| 52-108436 | 9/1977 | Japan | 260/887 |

*Primary Examiner*—Maurice J. Welsh
*Attorney, Agent, or Firm*—Diller, Ramik & Wight

[57] ABSTRACT

A can end sealing rubber composition
(A) consisting essentially of a styrene-butadiene rubbery copolymer, a tackifier and a filler, and
(B) having (1) a creep resistance coefficient K defined by the following equation of at least 0.1 but not exceeding 0.6, $$K = \log J_{90}{}^C(10) - \log J_{90}{}^C(1)$$

wherein $J_{90}{}^C(10)$ is the creep compliance measured 10 minutes after exerting a load when a fabricated article of the composition as a specimen is compressed in water at 90° C. by a parallel plate plastometer, and $J_{90}{}^C(1)$ is the creep compliance measured 1 minute after exerting a load when the specimen is compressed in water at 90° C. by a parallel plate plastomer, and (2) a creep compliance $J_{25}{}^C(1)$ of at least $3 \times 10^{-9}$ cm²/dyne but not exceeding $1 \times 10^{-6}$ cm²/dyne, the creep compliance being measured 1 minute after exerting a load when the specimen is compressed in water at 25° C. by a parallel plate plastometer.

6 Claims, 2 Drawing Figures

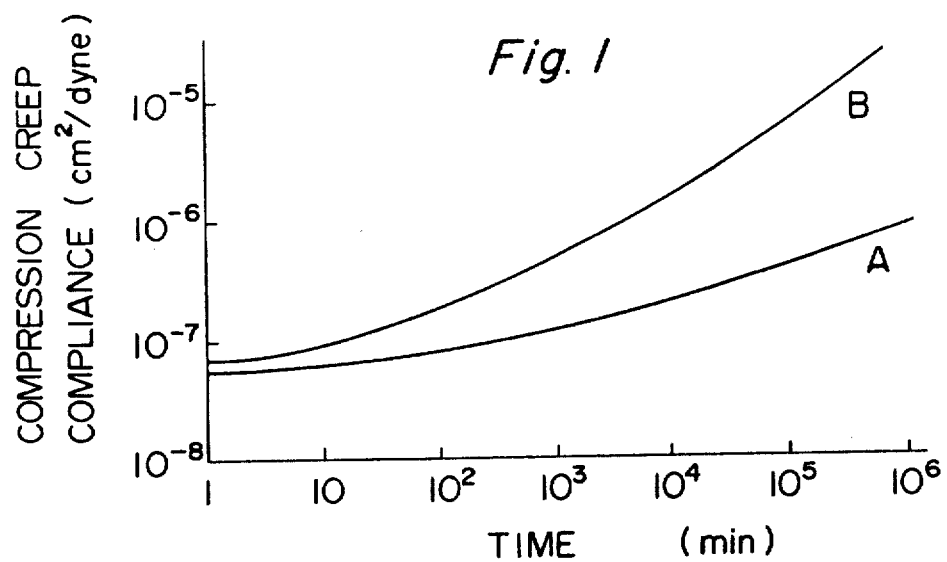
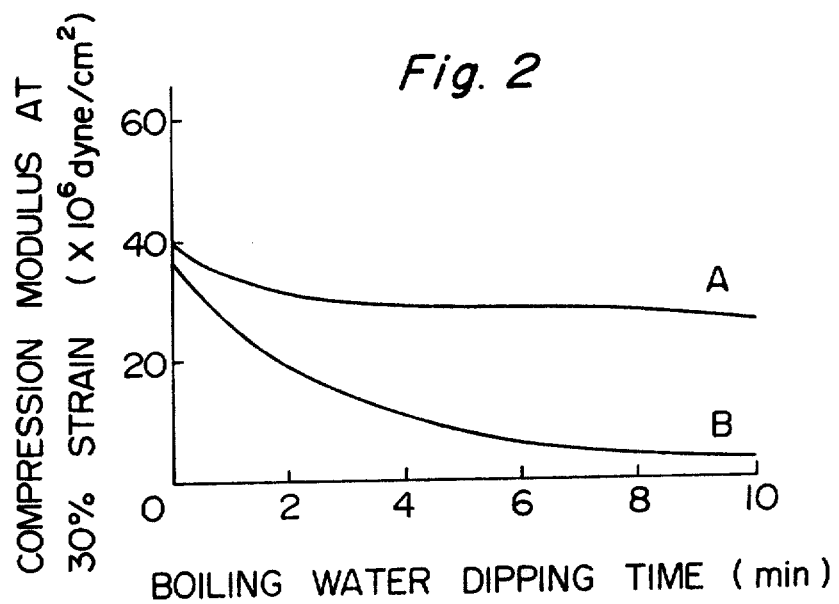

CAN END SEALING RUBBER COMPOSITION CONTAINING A STYRENE-BUTADIENE RUBBERY COPOLYMER, A TACKIFIER AND A FILLER

This invention relates to a can end sealing rubber composition comprising a styrene-butadiene rubber copolymer as a main ingredient.

It is the usual practice to produce closed cans by lining a can end material with a sealing rubber compound, and mounting it onto can bodies by seaming.

The conventional sealing rubber compounds are made of a dry rubber resulting from the separation of solids from a styrene-butadiene rubbery copolymer latex. When the dry rubber is used, it is necessary to masticate it with additives such as a tackifier and a filler in a Banbury mixer, and dispersing it in water using a surface-active agent or dissolving it in a solvent. Disadvantageously, however, the masticating operation causes the cutting of the rubber molecules and consequently deteriorates the properties of the sealing compound.

It is an object of this invention to provide a can end sealing composition which retains the superior properties of a styrene-butadiene rubbery copolymer.

The above object can be achieved by a can end sealing rubber composition consisting essentially of a styrene-butadiene rubbery copolymer, a tackifier and a filler and having (1) a creep resistance coefficient K defined by the following equation of at least 0.1 but not exceeding 0.6, $$K = \log J_{90}^C(10) - \log J_{90}^C(1)$$

wherein $J_{90}^C(10)$ is the creep compliance measured 10 minutes after exerting a load when a fabricated article of the composition as a specimen is compressed in water at 90° C. by a parallel plate plastometer, and $J_{90}^C(1)$ is the creep compliance measured 1 minute after exerting a load when the specimen is compressed in water at 90° C. by a parallel plate plastomer, and (2) a creep compliance $J_{25}^C(1)$ of at least $3 \times 10^{-9}$ cm²/dyne but not exceeding $1 \times 10^{-6}$ cm²/dyne, the creep compliance being measured 1 minute after exerting a load when the specimen is compressed in water at 25° C. by a parallel plate plastometer.

The composition of this invention characterized by the above-described creep resistance characteristics and creep compliances can be obtained by using as a main ingredient a styrene-butadiene copolymer latex (to be referred to as a hot rubber latex) prepared by emulsion polymerization of styrene and butadiene preferably at a temperature of 35° to 70° C. either as such or after diluting or concentrating it to a predetermined solids content without forming it into a dry rubber.

The conventional sealing rubber compound principally uses a styrene-butadiene rubbery copolymer obtained by emulsion polymerization at not more than 10° C. which is called a cold rubber. It is necessary therefore to remove the short stopper used in the polymerization from the rubber component to avoid its inclusion in the sealing compound. This is partly the reason why the copolymer must be used in the form of a dry rubber.

Hot rubber has actually been used in some formulations. But even in such a case, it is incorporated as a dry rubber in accordance with the method using cold rubber.

The present inventors have made investigations in regard to this point, and found that a sealing compound having a creep resistance coefficient of 0.1 to 0.6, preferably 0.15 to 0.45 and a creep compliance of $3 \times 10^{-9}$ to $1 \times 10^{-6}$ cm²/dyne, preferably $1 \times 10^{-8}$ to $5 \times 10^{-7}$ cm²/dyne, can be obtained by incorporating a hot rubber latex or a cold rubber latex in the diluted or concentrated state without separating rubber solids from it; and that the sealing compound having such characteristics possesses superior hot water resistance and exhibits a very good can sealing performance. Sealing compounds having a creep resistance coefficient and a creep compliance outside the above ranges have a poor sealing performance particularly for hot-filled can use.

The conventional sealing compound has deteriorated creep resistance and hot water resistance because the rubber molecules are cut during Banbury mixter mastication. As a result, it has insufficient sealing performance and may cause the leakage of the contents of cans. Furthermore, during masticating by a Banbury mixer, the rubber molecules undergo heat decomposition, and the decomposition product adversely affects the flavor of the contents of cans.

Resistance to hot water is evaluated by a decrease in compression modulus at a constant strain (30%) caused by dipping in boiling water. The decrease should desirably be small. Sealing rubber compounds having a large decrease of the compression modulus have poor sealing performance particularly for hot-filled can use.

The accompanying drawings are graphs showing a comparison of the properties of one example of the sealing rubber compound of this invention with those of the conventional sealing rubber compound.

FIG. 1 shows master curves of compression creep compliance-time, and

FIG. 2 shows boiling water dipping time-compression modulus curves.

Both hot rubber latices and cold rubber latices can be used so long as they meet the aforesaid creep resistance and creep compliance conditions. The hot rubber latices are preferred because they have better sealing performance especially at elevated temperatures.

In the sealing compound of this invention, the latex is used either as such or after having been diluted or concentrated, and the superior sealing performance especially at elevated temperatures are retained without deterioration. Hence, leakage-free good seals can be obtained, and no adverse effect on the flavors of can contents is caused.

The creep compliance of the sealing rubber composition is measured in the following manner.

A disc-shaped specimen is set between a top plate and a bottom plate of a parallel plate plastometer. The top plate, bottom plate and the specimen are dipped in water by raising a water tank containing water maintained at a predetermined temperature (25° C. or 90° C.), and maintained for 30 minutes.

After the dipping for the above-mentioned period, a load is exerted, and a change in thickness is observed after a lapse of a predetermined period (t, minutes). The creep compliance is calculated by the following equation.

$$J_T^C(t) = \frac{3V^2}{8\pi f}\left(\frac{1}{h^4} - \frac{1}{h_o^4}\right)$$

wherein $J_T^C(t)$ is the creep compliance after t minutes from the exertion of a load at T° C.; V is the volume of the specimen, and $\pi$ is the ratio of the circumference of a circle to its diameter; f is the load exerted; $h_o$ is the initial thickness of the specimen, and h is the thickness of the specimen after a lapse of t minutes from the exertion of a load.

The method of calculating the creep compliance is in accordance with Shoten Oka, Eiichi Fukada and Toshimaro Sone, "Zairyo Shiken" (Material Testing), 10, 333 (1961). Preferably, the hot rubber latex or cold rubber latex used in this invention has a styrene content of 23 to 55% by weight, a Mooney viscosity $(ML_{1+4}^{100° C.})$ of 25 to 160, and a solids content of 30 to 90% by weight.

When the solids content is lower than the aforesaid range, the amount of a thickener used for viscosity adjustment in the preparation of sealing compounds must be increased, and this is very likely to deteriorate the physical and/or mechanical properties of the sealing compounds after application. If the solids content is larger than the aforesaid range, the stability of a sol of the sealing compound is reduced.

Rubber latices having a Mooney viscosity $(ML_{1+4}^{100° C.})$ of 30 to 140 and a solids content of 40 to 60% by weight are more preferred.

The above-mentioned hot rubber latices or cold rubber latices and methods for producing them are known, and they are usually available with a solids content of 30 to 50% by weight. Accordingly, the hot rubber latices or cold rubber latices produced in a customary manner can be used as such, but if desired, they may be used after having been diluted or concentrated to the desired solids content.

Examples of the filler used as an ingredient of the sealing rubber compound of this invention are silicic fillers such as colloidal silica, silicic anhydride, hydrous silicic acid and synthetic silicates, light and/or heavy calcium carbonates, activated calcium carbonate, kaolin, fired clay, alumina white, talc powder, dolomite, alumina sulfate, barium sulfate, magnesium carbonate, magnesium silicate, magnesium oxide, calcium sulfate, pumice powder, glass powder, asbestos powder, zinc oxide, titanium dioxide and carbon black. They can be used either alone or in combination of two or more.

The suitable amount of the filler to be incorporated is 30 to 200 parts by weight, preferably 50 to 140 parts by weight, per 100 parts by weight of the rubber solids.

Most preferably, 60 to 100 parts by weight of clay, 10 to 40 parts by weight of titanium white and 0.1 to 1 part by weight of carbon black are used conjointly as the filler.

Examples of the tackifier used in this invention are rosin-type resins such as rosin, hydrogenated rosin, esters of these, or hardened rosin, phenolic resins modified with natural resins such as rosin or terpene, a xyleneformaldehyde resin and its modified products, and petroleum resins (Piccopale).

The amount of the tackifier is usually 5 to 200 parts by weight, preferably 80 to 150 parts by weight, per 100 parts by weight of the rubber solids.

As desired, the composition of this invention may be incorporated with thickeners such as sodium alginate, methyl cellulose, carboxymethyl cellulose, carboxymethyl starch, polyvinyl alcohol, poly(sodium acrylate) and karaya gum, antiseptics, surface-active agents, antioxidants and pH adjusters.

The method of mixing the hot rubber latex or cold rubber latex with the filler, the tackifier, and the other various additives is not particularly critical, and mixing can be effected by any known mixing machines.

Preferably, the filler, the tackifier and other additives are added in the form of an aqueous dispersion. But they may be directly added to the rubber latex.

The following Examples illustrate the present invention more specifically.

EXAMPLE 1

Two types of a styrene-butadiene copolymer latex were prepared using the polymerization recipes and conditions shown in Tables 1 and 2.

Table 1

| Polymerization recipe | (Copolymer A) | |
|---|---|---|
| | Butadiene | 60 (parts by weight) |
| | Styrene | 40 |
| | Rosin soap | 4.5 |
| | Dodecyl mercaptan | 0.5 |
| | Potassium persulfate | 0.3 |
| | Water | 180 |
| pH of the aqueous phase | | 10 |
| Polymerization temperature | | 50° C. |
| Conversion | | 80% |

Table 2

| Polymerization recipe | (Copolymer B) | |
|---|---|---|
| | Butadiene | 60 (parts by weight) |
| | Styrene | 40 |
| | Rosin soap | 4.5 |
| | Monohydroperoxide of diisopropylbenzene | 0.08 |
| | Sodium ethylenediaminetetraacetate | 0.035 |
| | Ferrous sulfate | 0.03 |
| | Iron-Trilon complex salt | 0.08 |
| | Trisodium phosphate | 0.5 |
| | Sodium β-naphthalenesulfonate | 0.15 |
| | Dodecyl mercaptan | 0.18 |
| | Water | 200 |
| pH of the water phase | | 10 |
| Polymerization temperature | | 5° C. |
| Conversion | | 70% |

The characteristics of these styrene/butadiene copolymer latices are shown in Table 3.

Table 3

| Characteristics | Copolymer latex A (hot rubber latex) | Copolymer latex B (cold rubber latex) |
|---|---|---|
| Styrene content (%) | 35 | 31 |
| Mooney viscosity $(ML_{1+4}^{100° C.})$ of rubber solid | 40 | 38 |
| Solids content (%) of the latex | 51 | 50 |
| Viscosity (CPS) of the latex | 55 | 55 |

The additives shown below are added to each of the Copolymer A latex and the Copolymer B latex to form a sealing rubber compound. Water was added at this time to adjust the solids content of the sealing rubber compound to 40%. The sealing compounds obtained are designated as Compound A and Compound B.

| Additives | Amounts (parts per 100 parts by weight of the rubber solid) |
|---|---|
| Clay (filler) | 60 |
| Titanium white (filler) | 10 |
| Rosin (tackifier) | 75 |
| Karaya gum (thickener) | 2 |
| Methyl cellulose (thickener) | 1 |
| Di-β-naphthyl phenylenediamine (antioxidant) | 1 |

Each of the Compounds A and B was tested for compression creep compliance (in water at 25° C. and 90° C.) and resistance to hot water.

FIG. 1 of the accompanying drawings shows master curves of the compression creep compliance of Compound A and Compound B. It is seen from FIG. 1 that Compound A has a less inclination than Compound B in its master curve of compression creep compliance, and does not easily flow.

The creep compliance [$J_{25}^C(1)$] measured in water at 25° C. and the creep resistance coefficient [K] of each of the compounds are shown below.

| | $J_{25}^C(1)$ | K |
|---|---|---|
| Compound A | $5.6 \times 10^{-8}$ | 0.20 |
| Compound B | $7.1 \times 10^{-8}$ | 0.47 |

The hot water resistance was measured as follows:

A sample was dipped in boiling water for a given period. Then, it was punched into disc-shaped pieces and subjected to a compression test. The hot water resistance was expressed as changes with the dipping time of the modulus of the sample at 30% strain. FIG. 2 of the accompanying drawings shows the results of the tests on Compound A and Compound B. It is evident from FIG. 2 that Compound A undergoes less reduction in modulus on dipping in boiling water than Compound B, and therefore has better hot water resistance.

The two sealing Compounds A and B were lined on can ends of 202 Dia, and dried for 10 minutes at 90° C. A 1.5% aqueous solution of citric acid was filled at 0°–4° C. into side lap seamed open top cans of 202 Dia having a capacity of 250 ml, and sodium bicarbonate was added so as to adjust the volume of carbon dioxide gas to 4.5. The lined can ends were secured to the can bodies by a double seaming process. These cans containing carbon dioxide gas will be referred to as carbonated cans.

On the other hand, 10% orange juice was filled at 95° C. into the same open top cans as described above, and the top end was secured to the can bodies by a double seaming process. The cans filled at 95° C. will be referred to as hot-filled cans. The total number of cans having the aforesaid contents was 3,000 in each case. Of them, 1500 cans were stored at 50° C., and the remaining 1500 cans, at room temperature, for use in a leakage test.

Sites of leakage were directly observed in the carbonated cans. The hot-filled cans were examined by striking to locate these cans which gave off a bad sound.

The cans with a bad sound were examined for the degree of vacuum by a vacuum meter, and those cans in which the degree of vacuum decreased were classified as leakage cans.

The test results are shown in Table 4. It is clear from Table 4 that the sealing compound of this invention (Compound A) showed superior sealing performance both on the carbonated cans and hot-filled cans to the sealing rubber compound containing a cold rubber latex (Compound B).

Table 4

| Contents | Compound | Stored at | After one week | After one month | After 3 months | After 6 months | Total ratio of leakage (%) |
|---|---|---|---|---|---|---|---|
| Aqueous solution of citric acid plus sodium bicarbonate | A | 50° C. | 0 | 0 | 0 | 0 | 0 |
| | | Room temp. | 0 | 0 | 0 | 0 | 0 |
| | B | 50° C. | 0 | 0 | 1 | 1 | 0.13 |
| | | Room temp. | 0 | 1 | 1 | 1 | 0.20 |
| 10% orange juice | A | 50° C. | 0 | 0 | 0 | 0 | 0 |
| | | Room temp. | 0 | 0 | 0 | 0 | 0 |
| | B | 50° C. | 0 | 0 | 0 | 1 | 0.07 |
| | | Room temp. | 0 | 0 | 1 | 1 | 0.13 |

EXAMPLE 2

Three kinds of sealing compound were prepared using rubbers having the characteristics shown in Table 5.

Compound C was prepared by mixing the hot rubber latex polymerized at 50° C. with an aqueous dispersion of 10 parts of titanium white, 85 parts of clay and 1 part of carbon black as fillers, an aqueous dispersion of 60 parts of a rosin-type tackifier, and also 0.5 part of karaya gum, 3.5 parts of methyl cellulose, 1 part of ammonium oleate and 1 part of di-β-naphthyl phenylenediamine with stirring, the amounts of all of the additives being based on 100 parts by weight of rubber solid.

Compound D was prepared by separating rubber from the cold rubber latex polymerized at 5° C., washing and drying it, adding 10 parts of titanium white, 85 parts of clay and 1 part of carbon black, the amounts being based on 100 parts of the rubber, and masticating the mixture in a Banbury mixer, further adding 60 parts of a rosin-type tackifier, 0.5 part of karaya gum, 3.5 parts of methyl cellulose, 1 part of ammonium oleate, and 1 part of di-β-naphthyl phenylenediamine, and dispersing the mixture in water by a high-speed mixer.

Compound E was prepared by adding 60 parts of a rosin-type tackifier and 1 part of di-β-naphthyl phenylenediamine to 100 parts of rubber obtained by masticating the mixture containing the same fillers as in Compound D, dissolving the soluble ingredients by n-hexane, and dispersing the insoluble ingredients in the mixture.

Table 5

| Compound | Characteristics of rubber | | |
|---|---|---|---|
| | Polymerization temperature (°C.) | Styrene content (%) | Mooney viscosity (ML$_{1+4}^{100°C.}$) |
| C | 50 | 35 | 41 |
| D | 5 | 33 | 39 |
| E | 5 | 36 | 41 |

The three kinds of rubber compounds were lined on TFS can ends of 202 Dia and dried, and subjected to a leakage test in the same manner as in Example 1.

The results are shown in Table 6 together with the $J_{25}^C(1)$ and K values of the sample compounds. It is seen from the table that Compound C prepared from the hot rubber latex in accordance with this invention exhibits superior sealing performance both on the carbonated cans and hot-filled cans to the Compounds D and E which were prepared by different methods.

EXAMPLE 3

Each of the six kinds of hot rubber latices having the characteristics shown in Table 7 was mixed with stirring with an aqueous dispersion of 15 parts of titanium white, 40 parts of clay and 1 part of carbon black, an aqueous dispersion of 35 parts of a rosin-type resin, and also with 5 parts of karaya gum, 5 parts of methyl cellulose, 1 part of sodium oleate and 1 part of di-β-naphthyl phenylenediamine, the amounts of the additives being based on 100 parts of the rubber solids. Thus, six kinds of sealing compounds were obtained. These sealing compounds were each coated on TFS can ends of 202 Dia and dried, and subjected to the same leakage test as in Example 1. Table 8 shows the results of observation of leakage or the decrease in the degree of vacuum and the $J_{25}^C(1)$ and K values of the sealing compounds.

It is seen from Table 8 that sealing compounds having very good sealing performance can be obtained by using hot rubber latices in which the rubber solid had a Mooney viscosity (ML$_{1+4}^{100°C.}$) of 25 to 140 (G–K).

Table 6

| Contents | Compound | $J_{25}^C(1)$ (cm²/dyne) | K | Stored at | The number of cans which showed leakage or a decrease in the degree of vacuum | | | | Ratio of leakage (%) |
|---|---|---|---|---|---|---|---|---|---|
| | | | | | After one week | After one month | After 3 months | After 6 months | |
| Aqueous solution of citric acid plus sodium bicarbonate | C | 5.4 × 10⁻⁸ | 0.25 | 50° C. | 0 | 0 | 0 | 0 | 0 |
| | | | | RT* | 0 | 0 | 0 | 0 | 0 |
| | D | 5.8 × 10⁻⁸ | 0.51 | 50° C. | 1 | 0 | 0 | 1 | 0.13 |
| | | | | RT | 0 | 0 | 1 | 1 | 0.13 |
| | E | 2.3 × 10⁻⁷ | 0.55 | 50° C. | 0 | 1 | 3 | 2 | 0.40 |
| | | | | RT | 0 | 0 | 2 | 2 | 0.27 |
| 10% orange juice | C | 5.4 × 10⁻⁸ | 0.25 | 50° C. | 0 | 0 | 0 | 0 | 0 |
| | | | | RT | 0 | 0 | 0 | 0 | 0 |
| | D | 5.8 × 10⁻⁸ | 0.51 | 50° C. | 0 | 0 | 0 | 1 | 0.07 |
| | | | | RT | 0 | 0 | 1 | 1 | 0.13 |
| | E | 2.3 × 10⁻⁷ | 0.55 | 50° C. | 1 | 0 | 3 | 3 | 0.47 |
| | | | | RT | 0 | 1 | 1 | 2 | 0.27 |

*RT = room temperature

Table 7

| Compound | Polymerization temperature of latex (°C.) | Mooney viscosity (ML$_{1+4}^{100°C.}$) of the rubber solid | pH of the latex | Solids content (%) of latex | Viscosity (cps) of latex | Styrene content (%) |
|---|---|---|---|---|---|---|
| G | 50 | 25 | 10.0 | 50 | 55 | 40 |
| H | 50 | 31 | 9.9 | 50 | 53 | 42 |
| I | 50 | 52 | 10.0 | 51 | 58 | 41 |
| J | 50 | 98 | 9.8 | 48 | 60 | 42 |
| K | 50 | 140 | 9.9 | 49 | 56 | 39 |
| L | 50 | 159 | 10.1 | 51 | 55 | 39 |

Table 8

| Contents | Compound | $J_{25}^C(1)$ (cm²/dyne) | K | Stored at | The number of cans which showed leakage or a decrease in the degree of vacuum | | | | Total leakage ratio (%) |
|---|---|---|---|---|---|---|---|---|---|
| | | | | | After one week | After one month | After 3 months | After 6 months | |
| Aqueous solution of citric acid plus sodium bicarbonate | G | 1.4 × 10⁻⁸ | 0.44 | 50° C. | 0 | 0 | 0 | 1 | 0.07 |
| | | | | RT* | 0 | 0 | 0 | 1 | 0.07 |
| | H | 6.5 × 10⁻⁸ | 1.39 | 50° C. | 0 | 0 | 0 | 0 | 0 |
| | | | | RT | 0 | 0 | 0 | 0 | 0 |
| | I | 4.0 × 10⁻⁸ | 0.22 | 50° C. | 0 | 0 | 0 | 0 | 0 |
| | | | | RT | 0 | 0 | 0 | 0 | 0 |
| | J | 1.8 × 10⁻⁸ | 0.16 | 50° C. | 0 | 0 | 0 | 0 | 0 |
| | | | | RT | 0 | 0 | 0 | 0 | 0 |
| | K | 1.1 × 10⁻⁸ | 0.13 | 50° C. | 0 | 0 | 0 | 1 | 0.07 |
| | | | | RT | 0 | 0 | 0 | 0 | 0 |
| | L | 5.0 × 10⁻⁹ | 0.19 | 50° C. | 0 | 1 | 1 | 2 | 0.27 |
| | | | | RT | 0 | 0 | 0 | 1 | 0.07 |
| 10% orange | G | 1.4 × 10⁻⁸ | 0.44 | 50° C. | 0 | 0 | 0 | 1 | 0.07 |

Table 8-continued

| Contents | Compound | $J_{25}^C(1)$ (cm²/dyne) | K | Stored at | After one week | After one month | After 3 months | After 6 months | Total leakage ratio (%) |
| --- | --- | --- | --- | --- | --- | --- | --- | --- | --- |
| juice |   |   |   | RT | 0 | 0 | 0 | 1 | 0.07 |
|   | H | 6.5 × 10⁻⁸ | 1.39 | 50° C. | 0 | 0 | 0 | 0 | 0 |
|   |   |   |   | RT | 0 | 0 | 0 | 0 | 0 |
|   | I | 4.0 × 10⁻⁸ | 0.22 | 50° C. | 0 | 0 | 0 | 0 | 0 |
|   |   |   |   | RT | 0 | 0 | 0 | 0 | 0 |
|   | J | 1.8 × 10⁻⁸ | 0.16 | 50° C. | 0 | 0 | 0 | 0 | 0 |
|   |   |   |   | RT | 0 | 0 | 0 | 0 | 0 |
|   | K | 1.1 × 10⁻⁸ | 0.13 | 50° C. | 0 | 1 | 0 | 1 | 0.13 |
|   |   |   |   | RT | 0 | 0 | 0 | 1 | 0.07 |
|   | L | 5.0 × 10⁻⁹ | 0.19 | 50° C. | 0 | 0 | 1 | 3 | 0.27 |
|   |   |   |   | RT | 0 | 0 | 1 | 2 | 0.20 |

*RT = room temperature

EXAMPLE 4

Five kinds of sealing compounds were prepared using the same recipes as in the compounds of Example 2 except that hot rubber latices having the characteristics shown in Table 9 were used.

These sealing compounds were lined on TFS can ends of 202 Dia and dried. In the same way as in Example 1, the two kinds of contents as used in Example 1 were filled in open top cans and the top end was secured to them by a double-seaming process. Three thousand cans in total were filled. Out of them, 1500 cans were stored at 50° C., and the remainder, at room temperature. Leakage or the decrease of the degree of vacuum with time were observed. The results are given in Table 10 together with the $J_{25}^C(1)$ and K values of the sealing compounds.

The results show that the preferred styrene content of rubber is 23 to 55% (M–P).

Table 9

| Compound | Polymerization temperature of latex (°C.) | Mooney viscosity $(ML\vert_{+4}^{100°C.})$ of the rubber solid | pH of the latex | Solids content (%) of latex | Viscosity (cps) of latex | Styrene content (%) |
| --- | --- | --- | --- | --- | --- | --- |
| M | 50 | 40 | 10.0 | 50 | 55 | 23 |
| N | 50 | 43 | 10.0 | 48 | 56 | 35 |
| O | 50 | 41 | 10.0 | 50 | 55 | 40 |
| P | 50 | 40 | 10.0 | 50 | 54 | 50 |
| Q | 50 | 41 | 10.0 | 49.5 | 56 | 60 |

Table 10

| Contents | Compound | $J_{25}^C(1)$ (cm²/dyne) | K | Stored at | After one week | After one month | After 3 months | After 6 months | Total leakage ratio (%) |
| --- | --- | --- | --- | --- | --- | --- | --- | --- | --- |
| Aqueous solution of citric acid plus sodium bicarbonate | M | 6.1 × 10⁻⁷ | 0.30 | 50° C. | 0 | 0 | 0 | 2 | 0.13 |
|   |   |   |   | RT* | 0 | 0 | 0 | 1 | 0.07 |
|   | N | 2.2 × 10⁻⁷ | 0.25 | 50° C. | 0 | 0 | 0 | 0 | 0 |
|   |   |   |   | RT | 0 | 0 | 0 | 0 | 0 |
|   | O | 6.3 × 10⁻⁸ | 0.21 | 50° C. | 0 | 0 | 0 | 0 | 0 |
|   |   |   |   | RT | 0 | 0 | 0 | 0 | 0 |
|   | P | 3.1 × 10⁻⁸ | 0.36 | 50° C. | 0 | 0 | 0 | 1 | 0.07 |
|   |   |   |   | RT | 0 | 0 | 0 | 0 | 0 |
|   | Q | 1.0 × 10⁻⁸ | 0.47 | 50° C. | 0 | 1 | 1 | 1 | 0.20 |
|   |   |   |   | RT | 0 | 0 | 1 | 1 | 0.13 |
| 10% orange juice | M | 6.1 × 10⁻⁷ | 0.30 | 50° C. | 0 | 0 | 0 | 1 | 0.07 |
|   |   |   |   | RT | 0 | 0 | 0 | 0 | 0 |
|   | N | 2.2 × 10⁻⁷ | 0.25 | 50° C. | 0 | 0 | 0 | 0 | 0 |
|   |   |   |   | RT | 0 | 0 | 0 | 0 | 0 |
|   | O | 6.3 × 10⁻⁸ | 0.21 | 50° C. | 0 | 0 | 0 | 0 | 0 |
|   |   |   |   | RT | 0 | 0 | 0 | 0 | 0 |
|   | P | 3.1 × 10⁻⁸ | 0.36 | 50° C. | 0 | 0 | 0 | 1 | 0.07 |
|   |   |   |   | RT | 0 | 0 | 0 | 0 | 0 |
|   | Q | 1.0 × 10⁻⁸ | 0.47 | 50° C. | 1 | 0 | 1 | 2 | 0.27 |
|   |   |   |   | RT | 0 | 0 | 1 | 1 | 0.13 |

EXAMPLE 5

Compound A of this invention prepared in Example 1 was coated on each of aluminum can ends, tin-plated steel can ends and TFS can ends, and dried. In the same way as in Example 1, two kinds of contents were filled in open top cans and the top end was secured by a double seaming process. In this experiment, 12 kinds of combinations of can body-can end were used as follows:

Three-piece can of tin-plated steel—aluminum end,
three-piece can of tin-plated steel—tin plated steel end, two-piece can of tin-plated steel—aluminum end,
two-piece can of tin-plated steel—tin-plated steel end,
two-piece can of tin-plated steel—TFS end,
two-piece can of aluminum—aluminum end,
two-piece can of aluminum—tin-plated steel end,
two-piece can of aluminum—TFS end,
TFS cement bonded can—aluminum end,
TFS cement bonded can—tin-plated steel end, and
TFS cement bonded can—TFS can end.

The same compound was lined on can ends for a No. 1 oval can and a No. 8 rectangular can and dried. The two kinds of contents were filled in the same way, and the top end was secured by a double seaming process.

These filled cans were stored either at 50° C. or at room temperature in the same way as in Example 1, and leakage or a decrease in the degree of vacuum was observed. None of the cans showed leakage or gave off a bad sound during a six-month period.

EXAMPLE 6

Using the recipes shown in Table 11, eleven kinds of sealing compounds were prepared.

Compound I was prepared by adding 100 parts of kaolin clay to 100 parts of a rubber solid of styrene-butadiene copolymer (SBR) polymerized at 50° C., masticating the mixture by a Banbury mixer, adding 100 parts of a rosin-type resin (tackifier) and 1 part of di-$\beta$-naphthyl phenylenediamine per 100 parts of the rubber, dissolving the soluble ingredients by n-hexane, and dispersing the insoluble ingredients in it.

Compound II was obtained by adding benzoyl peroxide to Compound I in an amount of 0.5 part per 100 parts of rubber solid.

Compounds III to XI were obtained by mixing the styrene-butadiene copolymer latex with stirring with a resin, a filler, a thickener, an antioxidant, a surfactant and other additives. The characteristics of the rubber, and the types and amounts of the resin and fillers are shown in Table 11. The thickner was a mixture of 3 parts of methyl cellulose and 1 part of kayara gum per 100 parts of the rubber solid, and the surface-active agent was 1 part of ammonium oleate per 100 parts of the rubber solid. The antioxidant was 1 part of di-$\beta$-naphthyl phenylenediamine per 100 parts of the rubber solid.

The eleven kinds of sealing compounds were lined on can ends of 202 Dia, and dried at 90° C. for 10 minutes. When compound B was used, the ends were further heated at 120° C. for 1 minute to cure the compound.

Two kinds of contents were filled in the same way as in Example 1.

The total number of filled cans was 3000 in each case. Our of them, 1500 cans were stored at 50° C., and the remainder, at room temperature. They were subjected to the leakage test in the same way as in Example 1.

The compression creep compliance of the eleven sealing compounds in water were measured.

The samples used for measuring compression creep compliance were obtained by superimposing several dry films of a given sealing compound to a thickness of about 5 mm, and punching the laminate into a disc-shaped piece with a diameter of about 5 mm.

The creep resistance coefficient (K) and $J_{25}{}^C(1)$ values of the eleven compounds used in the leakage test are shown in Table 12, and the results of the leakage test are shown in Table 13. A comparison of Table 12 with Table 13 shows that compounds having a creep resistance coefficient of at least 0.1 but not exceeding 0.6 and a $J_{25}{}^C(1)$ value of at least $3 \times 10^{-9}$ but not exceeding $1 \times 10^{-6}$ have superior sealability, and those having a creep resistance coefficient of at least 0.15 but not exceeding 0.45 and a $J_{25}{}^C(1)$ value of at least $1 \times 10^{-8}$ but not exceeding $5 \times 10^{-7}$ show a further improvement in sealing performance.

Table 11

| | | Characteristics of rubber solid | | | Resin | | | Filler | | Content of other ingredient (PHR) |
|---|---|---|---|---|---|---|---|---|---|---|
| Compound | Method for preparation | Polymerization temperature (°C.) | Styrene content (%) | Mooney viscosity (ML 1+4 100°C) | Type and softening point (°C.) | | Content (PHR) | Type | Content (PHR) | |
| I | Solvent | 50 | 23 | 30 | Rosin-type | (83) | 100 | Kaolin clay | 100 | 1 |
| II | Solvent | 50 | 23 | 30 | Rosin-type | (83) | 100 | Kaolin clay | 100 | 1.5 |
| III | Latex | 50 | 23 | 30 | Rosin-type | (83) | 50 | Kaolin clay | 120 | 6 |
| IV | Latex | 50 | 23 | 40 | Xylene-type | (95) | 70 | Kaolin clay | 100 | 6 |
| V | Latex | 50 | 30 | 50 | Petroleum resin | (90) | 100 | Kaolin clay | 90 | 6 |
| VI | Latex | 50 | 40 | 70 | Rosin-type | (83) | 120 | Kaolin clay + white carbon | 80 | 6 |
| VII | Latex | 50 | 50 | 120 | Rosin-type | (104) | 70 | Calcium carbonate | 100 | 6 |
| VIII | Latex | 50 | 50 | 120 | Rosin-type | (83) | 100 | Kaolin clay | 100 | 6 |
| IX | Latex | 50 | 60 | 140 | Rosin-type | (83) | 100 | Kaolin clay | 120 | 6 |
| X | Latex | 5 | 23 | 30 | Rosin-type | (83) | 80 | Kaolin clay | 100 | 6 |
| XI | Latex | 5 | 35 | 50 | Rosin-type | (83) | 90 | Kaolin clay | 100 | 6 |

Table 12

| Compound | K | $J_{25}^C(1)$ (cm$^2$/dyne) |
|---|---|---|
| I | 0.96 | $2.1 \times 10^{-6}$ |
| II | 0.05 | $7.0 \times 10^{-7}$ |
| III | 0.41 | $6.1 \times 10^{-7}$ |
| IV | 0.15 | $1.3 \times 10^{-8}$ |
| V | 0.21 | $3.2 \times 10^{-9}$ |
| VI | 0.28 | $3.5 \times 10^{-8}$ |
| VII | 0.34 | $2.9 \times 10^{-7}$ |
| VIII | 0.59 | $2.2 \times 10^{-8}$ |
| IX | 0.45 | $1.5 \times 10^{-9}$ |
| X | 0.66 | $6.2 \times 10^{-9}$ |
| XI | 0.52 | $1.1 \times 10^{-9}$ |

Table 13-1

| | | Content: Aqueous solution of citric acid plus sodium bicarbonate | | | | |
|---|---|---|---|---|---|---|
| | | The number of cans which showed leakage or a decrease in the degree of vacuum | | | | Total Leakage |
| Compound | Stored at | After one week | After one month | After 3 months | After 6 months | leakage ratio (%) |
| I | RT* | 0 | 1 | 0 | 1 | 0.13 |
| | 50° C. | 1 | 1 | 1 | 1 | 0.27 |
| II | RT | 2 | 0 | 1 | 0 | 0.20 |
| | 50° C. | 3 | 0 | 0 | 1 | 0.27 |
| III | RT | 0 | 0 | 0 | 0 | 0 |
| | 50° C. | 0 | 0 | 1 | 0 | 0.07 |
| IV | RT | 0 | 0 | 0 | 0 | 0 |
| | 50° C. | 0 | 1 | 0 | 0 | 0.07 |
| V | RT | 1 | 0 | 0 | 0 | 0.07 |
| | 50° C. | 0 | 0 | 0 | 0 | 0 |
| VI | RT | 0 | 0 | 0 | 0 | 0 |
| | 50° C. | 0 | 0 | 0 | 0 | 0 |
| VII | RT | 0 | 0 | 0 | 0 | 0 |
| | 50° C. | 0 | 0 | 0 | 0 | 0 |
| VIII | RT | 0 | 0 | 0 | 0 | 0 |
| | 50° C. | 0 | 0 | 0 | 1 | 0.07 |
| IX | RT | 2 | 0 | 0 | 1 | 0.20 |
| | 50° C. | 2 | 0 | 1 | 1 | 0.27 |
| X | RT | 0 | 0 | 1 | 1 | 0.13 |
| | 50° C. | 0 | 1 | 0 | 3 | 0.27 |
| XI | RT | 3 | 1 | 0 | 0 | 0.27 |
| | 50° C. | 2 | 0 | 1 | 2 | 0.33 |

*RT = room temperature

Table 13-2

| | | Content: 10% orange juice | | | | |
|---|---|---|---|---|---|---|
| | | The number of cans which showed leakage or a decrease in the degree of vacuum | | | | Total leakage |
| Compound | Stored at | After one week | After one month | After 3 months | After 6 months | ratio (%) |
| I | RT* | 2 | 0 | 1 | 0 | 0.20 |
| | 50° C. | 0 | 1 | 2 | 1 | 0.27 |
| II | RT | 2 | 0 | 1 | 0 | 0.20 |
| | 50° C. | 2 | 1 | 0 | 1 | 0.27 |
| III | RT | 0 | 0 | 0 | 1 | 0.07 |
| | 50° C. | 0 | 0 | 0 | 0 | 0 |
| IV | RT | 0 | 0 | 0 | 0 | 0 |
| | 50° C. | 0 | 1 | 0 | 0 | 0.07 |
| V | RT | 1 | 0 | 0 | 0 | 0.07 |
| | 50° C. | 0 | 0 | 0 | 0 | 0 |
| VI | RT | 0 | 0 | 0 | 0 | 0 |
| | 50° C. | 0 | 0 | 0 | 0 | 0 |
| VII | RT | 0 | 0 | 0 | 0 | 0 |
| | 50° C. | 0 | 0 | 0 | 0 | 0 |
| VIII | RT | 0 | 0 | 0 | 0 | 0 |
| | 50° C. | 0 | 0 | 0 | 1 | 0.07 |
| IX | RT | 3 | 0 | 0 | 0 | 0.20 |
| | 50° C. | 2 | 1 | 0 | 1 | 0.27 |
| X | RRT | 0 | 1 | 1 | 1 | 0.20 |
| | 50° C. | 0 | 1 | 1 | 2 | 0.27 |
| XI | RT | 2 | 0 | 1 | 1 | 0.27 |
| | 50° C. | 3 | 0 | 0 | 0 | 0.20 |

*RT = room temperature

What we claim is:

1. A can end sealing rubber composition
   (A) consisting essentially of a styrene-butadiene rubbery copolymer latex obtained by emulsion polymerization at 35° to 70° C., a tackifier and a filler, and
   (B) having (1) a creep resistance coefficient K defined by the following equation of at least 0.1 but not exceeding 0.6, $$K = \log J_{90}{}^C(10) - \log J_{90}{}^C(1)$$

wherein $J_{90}{}^C(10)$ is the creep compliance measured 10 minutes after exerting a load when a fabricated article of the composition as a specimen is compressed in water at 90° C. by a parallel plate plastometer, and $J_{90}{}^C(1)$ is the creep compliance measured 1 minute after exerting a load when the specimen is compressed in water at 90° C. by a parallel plate plastometer, and (2) a creep compliance $J_{25}{}^C(1)$ of at least $3 \times 10^{-9}$ cm²/dyne but not exceeding $1 \times 10^{-6}$ cm²/dyne, the creep compliance being measured 1 minute after exerting a load when the specimen is compressed in water at 25° C. by a parallel plate plastomer.

2. The composition of claim 1 wherein the styrene-butadiene copolymer latex has a solids content of 30 to 90% by weight.

3. The composition of claim 1 wherein the solid rubber of the styrene-butadiene copolymer latex has a Mooney viscosity ($ML_{1+4}^{100°\ C.}$) of 25 to 160.

4. The composition of claim 1 wherein the styrene-butadiene copolymer latex has a styrene content of 23 to 55% by weight.

5. The composition of claim 1 which further comprises a surface active agent, an antioxidant and a thickener.

6. A can end sealing composition consisting essentially of a styrene-butadiene rubbery copolymer latex component, a tackifier and a filler; said latex component having a solids content of 40 to 60% by weight, a styrene content of 23 to 55% by weight, and the solid rubber of such latex component having a Mooney viscosity ($ML_{1+4}^{100°\ C.}$) of 3- to 140; said tackifier being present in amount of 80-150 parts by weight based on 100 parts of said solid rubber; said filler being present in amount of 50-140 parts by weight based upon 100 parts of said solid rubber; and said composition having (1) a creep resistance coefficient $K = \log J_{90}^C(10) - \log J_{90}^C(1)$ of at least 0.1 but not exceeding 0.6, where $J_{90}^C(10)$ is the creep compliance measured 10 minutes after exerting a load when a fabricated article of the composition as a specimen is compressed in water at 90° C. by a parallel plate plastometer, and $J_{90}^C(1)$ is the creep compliance measured 1 minute after exerting a load when the specimen is compressed in water at 90° C. by a parallel plate plastometer, and (2) a creep compliance $J_{25}^C(1)$ of at least $3 \times 10^{-9}$ cm²/dyne but not exceeding $1 \times 10^{-6}$ cm²/dyne, the creep compliance being measured 1 minute after exerting a load when the specimen is compressed in water at 25° C. by a parallel plate plastometer, said latex component being obtained by emulsion polymerization at 35° to 70° C.

* * * * *